United States Patent [19]

Robeson et al.

[11] Patent Number: 4,503,121

[45] Date of Patent: Mar. 5, 1985

[54] LAMINATE COMPOSITIONS WITH POLYARYLATE AND POLY(ARYL ETHER)

[75] Inventors: Lloyd M. Robeson, Whitehouse Station; John W. Lynn, Westfield, both of N.J.

[73] Assignee: Union Carbide Corporation, Danbury, Conn.

[21] Appl. No.: 596,075

[22] Filed: Apr. 4, 1984

Related U.S. Application Data

[63] Continuation of Ser. No. 335,452, Dec. 29, 1981, abandoned.

[51] Int. Cl.$^3$ .............................................. B32B 27/08
[52] U.S. Cl. ................................... 428/336; 428/411.1; 428/480; 428/520; 428/522; 528/174; 126/901; 126/417
[58] Field of Search ................ 528/174; 126/901, 417; 428/520, 522, 411, 480, 336

[56] References Cited

U.S. PATENT DOCUMENTS

| | | | |
|---|---|---|---|
| 3,264,536 | 8/1966 | Robinson et al. | 528/128 |
| 3,444,129 | 5/1969 | Young et al. | 260/47 |
| 3,460,961 | 8/1969 | Young et al. | 117/33.3 |
| 3,492,261 | 1/1970 | Young et al. | 260/30.4 |
| 3,503,779 | 3/1970 | Young et al. | 117/33.3 |
| 3,506,470 | 4/1970 | Young et al. | 117/33.3 |
| 3,900,548 | 8/1975 | Wiley | 156/244.11 |
| 4,020,046 | 4/1977 | King et al. | 528/174 |
| 4,108,837 | 8/1978 | Johnson et al. | 528/126 |

FOREIGN PATENT DOCUMENTS

| | | |
|---|---|---|
| 60420 | 6/1972 | Japan . |
| 96233 | 8/1973 | Japan . |
| 26042 | 3/1976 | Japan . |
| 1136766 | 12/1968 | United Kingdom . |

OTHER PUBLICATIONS

S. M. Cohen, R. H. Young and A. H. Markhart, *Transparent Ultraviolet-Barrier Coatings*, JPS A-1, vol. 9, 3263-3299, (1971).

V. V. Korshak et al., *Synthesis and Properties of Self-Protecting Polyarylates*, JPS A-1, vol. 7, 157-172, (1969).

*Primary Examiner*—George F. Lesmes
*Assistant Examiner*—E. Rollins Buffalow
*Attorney, Agent, or Firm*—Donald M. Papuga

[57] ABSTRACT

Described herein are laminate compositions comprising a polyarylate, or blends thereof, derived from a dihydric phenol and an aromatic dicarboxylic acid which is laminated upon the surface of a poly(aryl ether), particularly polysulfone. In contrast to the highly ultraviolet sensitive polysulfone, the laminate compositions of this invention exhibit good weatherability including no adverse effects, e.g., degradation, from prolonged ultraviolet irradiation exposure. The laminate compositions of this invention have beneficial utility in solar energy applications.

11 Claims, No Drawings

4,503,121

LAMINATE COMPOSITIONS WITH POLYARYLATE AND POLY(ARYL ETHER)

This application is a continuation of prior U.S. application Ser. No. 335,452 filing date 12/29/81, now abandoned.

BRIEF SUMMARY OF THE INVENTION

1. Technical Field

This invention is directed to laminate compositions comprising a polyarylate, or blends thereof, derived from a dihydric phenol and an aromatic dicarboxylic acid which is laminated upon the surface of a poly(aryl ether), particularly polysulfone. The polyarylate provides desirable protection for the poly(aryl ether) substrate from the adverse effects of prolonged weathering exposure including ultraviolet irradiation exposure even at thin coatings or layers, e.g., 1.5 mils thickness. The retention of desirable mechanical and chemical properties of poly(aryl ether) upon prolonged weathering exposure including ultraviolet irradiation exposure is achieved when a polyarylate is laminated upon the surface thereof. Polysulfone by itself is highly sensitive to degradation resulting from prolonged ultraviolet irradiation exposure. The laminate compositions of this invention have beneficial utility in solar energy applications.

2. Background Art

The instant invention discloses laminate compositions comprising a polyarylate, or blends thereof, derived from a dihydric phenol and an aromatic dicarboxylic acid which is laminated upon the surface of a poly(aryl ether), particularly polysulfone. It is known that polyarylates blended with certain thermoplastic polymers, as described in U.S. Pat. No. 4,259,458, exhibit good weatherability including no adverse effects such as degradation from prolonged ultraviolet irradiation exposure. Likewise, it is known that polyarylates coated or laminated onto certain thermoplastic polymers, e.g., poly(ethylene terephthalate), poly(vinyl chloride), polycarbonate, poly(methyl methacrylate), polystyrene and the like as described in the prior art references hereinbelow, exhibit good weatherability including no apparent adverse effects from prolonged ultraviolet irradiation exposure. However, it is also known that when a polyarylate is blended with a poly(aryl ether) thermoplastic polymer, particularly polysulfone, and subjected to prolonged weathering exposure including ultraviolet irradiation exposure, the resulting blend of polyarylate and polysulfone after weathering exposure exhibits a deterioration of mechanical and chemical properties. Because polyarylate/polysulfone blends exhibit degradation of mechanical and chemical properties resulting from ultraviolet irradiation exposure, it is unexpected and unobvious that polyarylate/polysulfone laminate compositions exhibit excellent stability upon ultraviolet irradiation exposure as illustrated in the working examples hereinafter.

Poly(aryl ether), particularly polysulfone, thermoplastic polymers are tough, rigid, high strength thermoplastic materials which maintain their properties over a wide temperature range of from −150° F. to above 300° F. They have a continuous use temperature of about 300° F. They are hydrolytically stable and have excellent mechanical, electrical and chemical properties which allows them to be molded into a variety of articles, preferably articles useful in heat transfer relationships. For example, polysulfone may desirably be molded in a radiation absorbent collector element used in solar heaters. When the collector element is connected to a mechanism for passing a fluid or gas medium to be heated through the housing of a solar heater, polysulfone would be highly desirable and effective for establishing an efficient heat transfer relationship between the radiation absorbent collector element and the mechanism for passing a fluid or gas medium to be heated through the housing of a solar heater. However, polysulfone by itself is highly sensitive to degradation resulting from prolonged ultraviolet irradiation exposure. Thus, it is desirable to increase the resistance of polysulfone toward degradation resulting from prolonged ultraviolet irradiation exposure and to make polysulfone acceptable for use in solar energy applications without essentially affecting its mechanical and chemical properties.

It has been unexpectedly and unobviously found as a result of the present invention that when a polyarylate is laminated upon the surface of a poly(aryl ether), particularly polysulfone, excellent protection is afforded polysulfone against degradation resulting from prolonged ultraviolet irradiation exposure. A laminate composition consisting of a polyarylate which is laminated upon the surface of a poly(aryl ether), particularly polysulfone, is desirable for use in solar energy applications. The retention of desirable mechanical and chemical properties of polysulfone upon prolonged weathering exposure including ultraviolet irradiation exposure is also achieved when a polyarylate is laminated upon the surface thereof.

The following prior art references describe aromatic polyesters, e.g., polyarylates derived from a dihydric phenol and an aromatic dicarboxylic acid, useful as ultraviolet light barriers:

U.S. Pat. No. 3,444,129 discloses rearrangeable aromatic polyesters which are the polymeric reaction product of an aromatic dihydric compound, e.g., a dihydric phenol, and an aromatic dicarboxyl compound, e.g., an aromatic dicarboxylic acid. The rearrangeable aromatic polyesters are useful as ultraviolet light barriers.

U.S. Pat. No. 3,460,961 describes substrates which are protected with a transparent aromatic polyester coating of two contiguous superposed layers. The aromatic polyester compounds are the reaction product of an aromatic dihydric compound, e.g., a dihydric phenol, and an aromatic dicarboxyl compound, e.g., an aromatic dicarboxylic acid. The aromatic polyester coating undergoes rearrangement in the presence of ultraviolet light to form a transparent compound which is stable to and will act as a barrier to ultraviolet light.

U.S. Pat. No. 3,492,261 describes film forming solutions of rearrangeable aromatic polyesters which are the polymeric reaction product of an aromatic dihydric compound, e.g., a dihydric phenol, and an aromatic dicarboxyl compound, e.g., an aromatic dicarboxylic acid. The solutions of aromatic polyesters, which can be coated onto a substrate and dried to transparent films, are capable of absorbing ultraviolet light and undergo rearrangement in the presence thereof to form a transparent compound which is stable to and will act as a barrier to ultraviolet light.

U.S. Pat. No. 3,503,779 discloses substrates which are coated with rearrangeable aromatic polyesters which are the polymeric reaction product of an aromatic dihydric compound, e.g., a dihydric phenol, and an aromatic dicarboxyl compound, e.g., an aromatic dicarboxylic acid. The outer exposed surface of the aromatic polyester coatings rearrange under the influence of ultraviolet light to form a new transparent compound which is stable to and will act as a barrier to ultraviolet light.

U.S. Pat. No. 3,506,470 relates to photoprints that are coated with solutions of aromatic polyesters, thin films of which are transparent and which will undergo rearrangement in the presence of ultraviolet light to form a transparent compound which is stable to and will act as a barrier to ultraviolet light. The aromatic polyesters are the polymeric reaction product of an aromatic dihydric compound, e.g., a dihydric phenol, and an aromatic dicarboxyl compound, e.g., an aromatic dicarboxylic acid. The patent states that the coated photoprints are protected from the harmful effects of ultraviolet light and retain their colors and clarity for longer periods than uncoated photoprints.

S. M. Cohen, R. H. Young and A. H. Markhart, *Transparent Ultraviolet-Barrier Coatings*, Journal of Polymer Science: Part A-1, Vol. 9, 3263–3299 (1971) describes the synthesis of a number of phenyl polyesters including polyarylates derived from a dihydric phenol and an aromatic dicarboxylic acid useful as protective coatings for substrates ordinarily sensitive to ultraviolet light. The molecular backbone of the phenyl polyesters is rearranged under ultraviolet irradiation to form an o-hydroxybenzophenone structure. This photochemical Fries rearrangement produces ultraviolet opacity in the irradiated film while maintaining visual transparency. Thin coatings, e.g., 0.3–0.5 mils thickness, of these phenyl polyesters protect substrates ordinarily sensitive to ultraviolet light. Spectroscopic analysis of the various rearranged films and coatings show that the o-hydroxybenzophenone polymer formed is concentrated at the irradiated surface of the original phenyl polyester coating as a "skin". Such a skin, formed in situ during the irradiation, functions to protect both the original phenyl polyester coating as well as the coated substrate from degradation by ultraviolet irradiation. This article further describes a "healing" mechanism, particularly as the exposed skin ultimately degrades under extended ultraviolet irradiation, more of the underlying phenyl polyester layer apparently rearranges to compensate for the loss. Thus, the clear coating functions both as a protective skin and a rearrangeable reservoir.

Even though the use of numerous thermoplastic polymer substrates, e.g., poly(ethylene terephthalate), poly(vinyl chloride), polycarbonate, poly(methyl methacrylate), polystyrene and the like, is demonstrated in each of the above prior art references with the exception of U.S. Pat. No. 3,506,470 relating only to photoprints, the use of a polysulfone thermoplastic polymer substrate is not disclosed in any of these references. As noted previously, when a polyarylate is blended with polysulfone and the blend is subjected to weathering exposure including ultraviolet irradiation exposure, deterioration is observed of the mechanical and chemical properties of the blend. This is in contrast to other known polyarylate thermoplastic polymer blends, coatings and laminates referred to hereinabove which exhibit good weatherability including no adverse effects from prolonged ultraviolet irradiaion exposure. It is, therefore, unexpected that a polyarylate laminated upon the surface of poly(aryl ether), particularly polysulfone, affords excellent protection to polysulfone against degradation resulting from prolonged weathering exposure including ultraviolet irradiation exposure. Moreover, none of the above prior art references disclose or suggest the beneficial utility of the laminate compositions of this invention in solar energy applications. None of the above prior art references and no prior art is currently known to us which discloses laminate compositions comprising a polyarylate, or blends thereof, derived from a dihydric phenol and an aromatic dicarboxylic acid which is laminated upon the surface of a poly(aryl ether), particularly polysulfone, such laminate compositions having beneficial utility in solar energy applications.

DISCLOSURE OF INVENTION

The present invention provides laminate compositions comprising a polyarylate, or blends thereof, derived from a dihydric phenol and an aromatic dicarboxylic acid which is laminated upon the surface of a poly(aryl ether), particularly polysulfone. Because polysulfone by itself is highly sensitive to degradation resulting from prolonged ultraviolet irradiation exposure, the polyarylate provides an excellent protection barrier for polysulfone from the adverse effects of prolonged weathering exposure including ultraviolet irradiation exposure even at thin coatings or layers, e.g., 1.5 mils thickness. The retention of desirable mechanical and chemical properties of polysulfone upon prolonged weathering exposure including ultraviolet irradiation exposure is also achieved when a polyarylate is laminated upon the surface thereof. The laminate compositions of this invention have beneficial utility in solar energy applications. For example, a radiation absorbent collector element used in solar heaters may be desirably constructed with the laminate compositions of this invention. When the collector element is connected to a mechanism for passing a fluid or gas medium to be heated through the housing of a solar heater, the laminate compositions of this invention would be highly desirable and effective in construction of the collector element to provide an efficient heat transfer relationship between the radiation absorbent collector element and the mechanism for passing a fluid or gas medium to be heated through the housing of a solar heater. As used herein, laminate refers to a composition in which any covering, coating, layering or the like, e.g., polyarylate, may be placed over or layed over or above a substrate, e.g., poly(aryl ether), whether or not in contact therewith.

DETAILED DESCRIPTION

The polyarylates of this invention are derived from a dihydric phenol and at least one aromatic dicarboxylic acid.

A particularly desirable dihydric phenol is of the following formula:

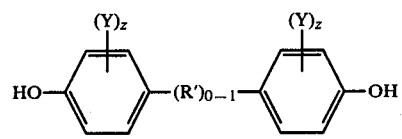

wherein Y is selected from alkyl groups of 1 to 4 carbon atoms, chlorine or bromine, each z, independently, has a value of from 0 to 4, inclusive, and R' is a divalent saturated or unsaturated aliphatic hydrocarbon radical, particularly an alkylene or alkylidene radical having from 1 to 3 carbon atoms, or a cycloalkylidene or cycloalkylene radical having up to and including 9 carbon atoms. The preferred dihydric phenol is bisphenol-A. Other dihydric phenols useful in preparing the polyarylates of this invention include hydroquinone and resorcinol. The dihydric phenols may be used individually or in combination.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 75:25 to about 25:75. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213 and 3,133,898.

Preferably, the polyarylates used in this invention are prepared by the process described in U.S. Patent Application Ser. No. 189,561, filed Sept. 23, 1980, in the names of L. M. Maresca, et al. and titled "Improved Process For Preparing Polyarylates". This application describes an improved process for preparing a polyarylate having a reduced viscosity of from about 0.5 to greater than 1.0 dl/gm which process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million.

The poly(aryl ether) resin components suitable for use herein are linear, thermoplastic polyarylene polyether polysulfones, wherein the arylene units are interspersed with ether and sulfone linkages. These resins may be obtained by reaction of an alkali metal double salt of a dihydric phenol and a dihalobenzenoid compound, either or both of which contain a sulfone or ketone linkage i.e., $-SO_2-$ or $-CO-$ between arylene groupings, to provide sulfone or ketone units in the polymer chain in addition to arylene units and ether units. The polysulfone polymer has a basic structure comprising recurring units of the formula:

$$-(O-E-O-E')-$$

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. No. 3,264,536, and 4,108,837, for example.

The residuum of a dihydric phenol, E, is derived from dinuclear phenols having the structure:

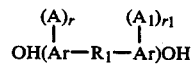
$$OH(Ar-R_1-Ar)OH$$

wherein Ar is an aromatic group and preferably is a phenylene group, A and $A_1$ may be the same or different inert substituent groups, such as alkyl groups having from 1 to 4 carbon atoms, halogen atoms, i.e., fluorine, chlorine, bromine or iodine, or alkoxy radicals having from 1 to 4 carbon atoms, r and $r_1$ are integers having a value of from 0 to 4, inclusive, and $R_1$ is representative of a bond between aromatic carbon atoms as in dihydroxydiphenyl, or is a divalent radical, including, for example, CO, O, S, S—S, $SO_2$ or a divalent organic hydrocarbon radical, such as alkylene, alkylidene, cycloalkylene, cycloalkylidene, or the halogen, alkyl, aryl, substituted alkylene, alkylidene, cycloalkylene, and cycloalkylidene radicals as well as alkarylene and aromatic radicals and a ring fused to both Ar groups. The residuum of a dihydric phenol, E, is also derived from mononuclear phenols such as hydroquinone.

Typical preferred polymers have recurring units having the following structure:

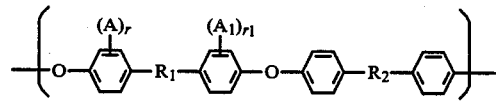

as described in U.S. Pat. No. 4,108,837, supra. In the foregoing formula A and $A_1$ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and $r_1$ are integers having a value of from 0 to 4, inclusive. Typically, $R_1$ is representative of a bond between aromatic carbon atoms or a divalent connecting radical and $R_2$ represents sulfone, carbonyl, or sulfoxide. Preferably, $R_1$ represents a bond between aromatic carbon atoms. Even more preferred are the thermoplastic polysulfones of the above formula wherein r and $r_1$ are zero, $R_1$ is a divalent connection radical of the formula

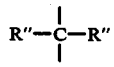

wherein R'' is selected from lower alkyl, aryl, and the halogen substituted groups thereof, preferably methyl and $R_2$ is a sulfone group.

The poly(aryl ether)s have a reduced viscosity of from about 0.4 to about 1.5 dl/g as measured in an appropriate solvent at an appropriate temperature depending on the particular polyether, such as in methylene chloride at 25° C.

The preferred poly(aryl ether)s have repeating units of the formula:

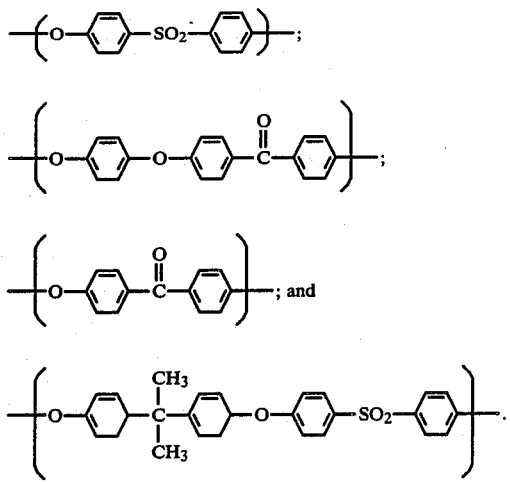

Other additives may be included in the laminate compositions of this invention. These additives include plasticizers; pigments; flame retardant additives, particularly, decabromodiphenyl ether and triaryl-phosphates, such as triphenylphosphate; thermal stabilizers; ultraviolet light stabilizers, processing aids, and the like.

Of particular importance in this invention are polymeric additives which when blended with the polyarylate yield transparent products. These polymeric aditives include poly(ethylene terephthalate), poly(butylene terephthalate), polyesters based on cylcohexane dimethanol reacted with aromatic dicarboxylic acids, and polycarbonate. These additives offer the ability to modify the viscosity of the polyarylate to match that of the polysulfone for improved coextrusion capabilities.

Although the preferred laminate compositions are transparent, pigmentation of the polysulfone layer or both the polysulfone and polyarylate layers is considered within the scope of this invention. Polysulfone pigmented with carbon black exhibits good mechanical performance after ultraviolet irradiation exposure, however, some surface chalking does occur. Of course, black pigmentation of the radiation absorbent collector element, i.e., heat transfer conduit, allows for efficient radiation absorption. The advantage of a transparent laminate composition in solar energy applications is that the radiation loss will be lowered due to the opacity of polysulfone at higher wavelength irradiation such as the infrared segment of the spectra. The heat transfer conduit constructed of a transparent laminate composition can therefore be used as a radiation suppressor often included in advanced solar energy collections. When a transparent heat transfer conduit is utilized, the fluid media, e.g., water, will be properly treated to effectively absorb radiation, for example, the water can be colored black.

The polyarylate provides desirable protection for the poly(aryl ether), particularly polysulfone, substrate from the adverse effects of prolonged weathering exposure including ultraviolet irradiation exposure even at thin coatings or layers, e.g., 1.5 mils thickness. It is preferred that the laminate compositions of this invention have a polyarylate layer thickness of at least about 1 mil, most preferably, at least about 2.5 mils. Because polyarylates have a low resistance to scratching and abrasion, it is desirable that the polyarylate layer thickness be at least about 1 mil to ensure prolonged protection for the poly(aryl ether), particularly polysulfone, and reduce the frequency for future polyarylate relayering, recoating or relaminating of polysulfone.

The laminate compositions of this invention can be prepared by solution coating, e.g., with methylene chloride solutions, by coextrusion of the polyarylate and the poly(aryl ether), particularly polysulfone, or by lamination of films or sheets with or without an adhesive interlayer. Solution coating of a polyarylate onto the surface of a polysulfone using methylene chloride as the polyarylate solvent is a preferable method for achieving the desired laminate structure. A coextruded system of polyarylate and polysulfone is commercially attractive in solar energy applications wherein the polysulfone provides a medium with excellent hydrolytic stability and the polyarylate provides an effective ultraviolet irradiation protective barrier for preserving the mechanical integrity of the system upon ultraviolet irradiation exposure.

As noted hereinabove, the laminate compositions of this invention have beneficial utility in solar energy applications, particularly solar heaters, which convert incident solar radiation into heat energy and transfer the absorbed heat either to a gas such as air or a liquid such as water, the former being commonly referred to as a solar air heater and the latter being commonly referred to as a solar water heater. A typical solar heater includes at least a housing having a light-transmitting or transparent front wall, a radiation absorbent collector element positioned in the housing and arranged to accept incident solar radiation passing through the front wall and a means for passing a fluid or gas medium to be heated through the housing in a heat transfer relationship with the collector element. The radiation absorbent collector element is preferably constructed of the laminate compositions of this invention in which the polyarylate is exposed to the incident solar radiation passing through the front wall and the poly(aryl ether), particularly polysulfone, is exposed to the means for passing a fluid or gas medium to be heated through the housing to form a heat transfer relationship therewith. Other potential solar energy applications include, for example, the use of the laminate compositions of this invention in the construction of solar heater housings, structural and support members of a solar heater, insulation and piping.

Although this invention has been described with respect to a number of details, it is not intended that this invention should be limited thereby. The examples which follow are intended solely to illustrate the embodiments of this invention which to date have been determined and are not intended in any way to limit the scope and the intent of this invention.

As used in the Examples appearing hereinafter, the following designations, terms and abbreviations have the indicated meanings:

hrs: hours
ft.: foot
lbs.: pounds
cu.: cubic
in.: inch
ASTM: American Society for Testing and Materials
Numbered examples: illustrate this invention
Lettered examples: are comparative or control examples which do not illustrate this invention.

The sheets, films and coating solution used in the Examples are identified as follows:

Polyarylate I.

A transparent extruded polyarylate film having a thickness of 2 mils prepared from Bisphenol-A and a mixture of 50 mole percent each of terephthalic and isophthalic acid chlorides by conventional methods and sold by Union Carbide Corporation under the designation Ardel D-100.

Polyarylate II.

A transparent extruded polyarylate film having a thickness of 5 mils prepared from Bisphenol-A and a mixture of 50 mole percent each of terephthalic and isphthalic acid chlorides by conventional methods and sold by Union Carbide Corporation under the designation Ardel D-100.

Polyarylate III.

A polyarylate solution consisting of about 12 weight percent polyarylate in methylene chloride prepared from Bisphenol-A and a mixture of 50 mole percent each of terephthalic and isophthalic acid chlorides by conventional methods and sold by Union Carbide Corporation under the designation Ardel D-100.

Polymethylmethacrylate I.

A cast polymethylmethacrylate transparent sheet having a thickness of 95 mils and commercially available from Rohm & Haas under the designation Plexiglas.

Polycarbonate I.

A clear transparent polycarbonate sheet having a thickness of 128 mils and commercially available from General Electric Corporation under the designation Lexan.

Polyester I.

A figerglass reinforced polyester sheet formulated for exterior applications having a thickness of 40 mils and commercially available from Kalwall Corporation under the designation Kalwall.

Polyvinylfluoride I.

A transparent polyvinylfluoride film having a thickness of 4 mils and commercially available from Dupont under the designation Tedlar.

Glass I.

A commercially available standard plate glass having a thickness of ⅛ inch.

The polysulfone substrate used in the Examples is identified as follows:

Polysulfone I.

A thermoplastic material having a reduced viscosity of 0.49 as measured in chloroform (0.2 grams of polysulfone in 100 milliliters of chloroform at 25° C.) and having the following formula:

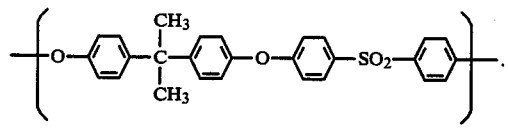

The ASTM standards for analytical methods used in the Examples are identified as follows:
ASTM-D1925: Yellowness Index.
ASTM D-1003: Haze and Light Transmission.
ASTM D-791: Purity. Color Factor is a calculated value from purity divided by thickness.

Pendulum impact strength was measured as follows: A steel pendulum was used, cylindrical in shape with a diameter of 0.85 inch and weighing 1.562 pounds. The striking piece, mounted almost at the top of the pendulum was a cylinder 0.3 inch in diameter. Film specimens, 4 inches long, 0.125 inch wide and about 1 to 20 mils thick were clamped between the jaws of the tester so that the jaws were spaced 1 inch apart. The 0.125 inch width of the film was mounted vertically. The pendulum was raised to a constant height to deliver 1.13 foot pounds at the specimen. When the pendulum was released the cylindrical striking piece hit the specimen with its flat end, broke the film, and traveled to a measured height beyond. The difference in the recovery height (i.e., the difference in the potential energy of the pendulum at the maximum point of the upswing) represents the energy absorbed by the specimen during rupture. The impact strength, expressed in foot-pounds per cubic inch, is obtained by dividing the pendulum energy loss by the volume of the specimen.

EXAMPLES 1, 2 AND A THROUGH F

Polysulfone I described hereinabove was compression molded at 250° C. in a 4 inch by 4 inch by 0.020 inch cavity mold to form a plaque. Various films or sheets also described hereinabove were placed over the plaques of Polysulfone I. The resulting laminates, described in Table I below, were submitted for accelerated weatherability by placing each laminate in an artificial weathering unit in accordance with the procedure and equipment described in ASTM D-1499 such that the exposed surface was the film or sheet placed over the plaque of Polysulfone I. After various time intervals of weathering exposure, i.e. 200 hours, 400 hours, 500 hours, 600 hours and 1000 hours, the laminates were removed from each plaque of Polysulfone I, the Polysulfone I plaque was shearcut into 0.125 inch wide strips and the pendulum impact strength was determined for each strip of Polysulfone I. The results of the pendulum impact strength test for various time intervals of weathering exposure are given in Table I. The initial pendulum impact strength of Polysulfone I before weathering exposure and the percent of retention of the initial pendulum impact strength for each strip of Polysulfone I after various time invervals of weathering exposure are also given in Table I. A dash indicates that no data is available.

TABLE I

| | | | Pendulum Impact Strength After Weathering Exposure (ft. lbs./cu. in.) | | | | | Retention (%) of Initial Pendulum Impact Strength After Weathering Exposure | | | | |
|---|---|---|---|---|---|---|---|---|---|---|---|---|
| Example | Laminate Description | Initial Pendulum Impact Strength (ft. lbs./cu. in.) | 200 hrs. | 400 hrs. | 500 hrs. | 600 hrs. | 1000 hrs. | 200 hrs. | 400 hrs. | 500 hrs. | 600 hrs. | 1000 hrs. |
| A | Control-Polysulfone I Only | 170 | 7 | — | — | — | — | 4.12 | — | — | — | — |
| 1 | Polyarylate I over | 170 | 82 | — | 99 | — | — | 48.2 | — | 58.2 | — | — |

EFFECT OF WEATHERING EXPOSURE ON PENDULUM IMPACT STRENGTH OF POLYSULFONE I

TABLE I-continued
EFFECT OF WEATHERING EXPOSURE ON PENDULUM IMPACT STRENGTH OF POLYSULFONE I

| Example | Laminate Description | Initial Pendulum Impact Strength (ft. lbs./cu. in.) | Pendulum Impact Strength After Weathering Exposure (ft. lbs./cu. in.) | | | | | Retention (%) of Initial Pendulum Impact Strength After Weathering Exposure | | | | |
|---|---|---|---|---|---|---|---|---|---|---|---|---|
| | | | 200 hrs. | 400 hrs. | 500 hrs. | 600 hrs. | 1000 hrs. | 200 hrs. | 400 hrs. | 500 hrs. | 600 hrs. | 1000 hrs. |
| 2 | Polyarylate II over Polysulfone I | 170 | 87 | — | 68 | — | — | 51.2 | — | 40.0 | — | — |
| B | Polymethylmethacrylate I over Polysulfone I | 170 | 6 | — | 2 | — | 4 | 3.5 | — | 1.2 | — | 2.4 |
| C | Polycarbonate I over Polysulfone I | 170 | 80 | — | 49 | — | 8 | 47.1 | — | 28.8 | — | 4.7 |
| D | Polyester I over Polysulfone I | 170 | 122 | 44 | — | 50 | — | 71.8 | 25.9 | — | 29.4 | — |
| E | Polyvinylfluoride I over Polysulfone I | 170 | 6 | 5 | — | 9 | 3 | 3.5 | 2.9 | — | 5.3 | 1.8 |
| F | Glass I over Polysulfone I | 170 | 5 | 5 | — | 2 | 2 | 2.9 | 2.9 | — | 1.2 | 1.2 |

The results of Table I clearly show the protective character of polyarylate film from the adverse effects of prolonged weathering exposure including ultraviolet irradiation exposure even over significantly thicker sheets of other transparent coverings. The control example using Polysulfone I alone, i.e., Example A, exhibited significant color change (yellowness) as well as severe haze development after weathering exposure. When Polysulfone I was covered with a polyarylate film, i.e., Polyarylate I and Polyarylate II in Examples 1 and 2 respectively, the color (yellowness) and haze of Polysulfone I was virtually unchanged after weathering exposure.

EXAMPLES 3 THROUGH 6 AND G

Five samples of Polysulfone I were compression molded at 250° C. in a 4 inch by 4 inch by 0.020 inch cavity mold to form a plaque. Two samples of the Polysulfone I were then covered with a polyarylate film described hereinabove, i.e., Examples 3 and 4, and two other samples of the Polysulfone I were solution-coated with a polyarylate solution also described hereinabove, i.e., Examples 5 and 6. The dried polyarylate film resulting from the solution-coating had a thickness of 1.5 mils in Examples 5 and 6. The remaining sample consisted of Polysulfone I alone, i.e., Example G, and was used as a control. The resulting laminates, described in Table II below, were submitted for accelerated weatherability by placing each laminate in an artificial weathering unit in accordance with the procedure and equipment described in ASTM D-1499 such that the exposed surface was the film or coating over the sample of Polysulfone I. After various time intervals of weathering exposure, i.e., 200 hours, 500 hours and 1000 hours, the laminates were removed from the weathering unit and the color factor, light transmission, haze and purity were determined for each sample of Polysulfone I. The results of the color factor, light transmission, haze and purity tests for the various time intervals of weathering exposure are given in Table II. The light transmission and haze values after weathering exposure for Examples 3 and 4 were measured on the Polysulfone I plaque alone with the polyarylate film removed therefrom for 500 hours and 1000 hours exposure (the total laminate composition was used for the initial data and 200 hour data). The initial color factor, light transmission, haze and purity of Polysulfone I before weathering exposure are also given in Table II.

TABLE II
EFFECT OF WEATHERING EXPOSURE ON COLOR FACTOR, LIGHT TRANSMISSION, HAZE AND PURITY OF POLYSULFONE I

| Example | Laminate Descr. | Initial Data Before Weathering Exposure | | | | Data After Weathering Exposure | | | | | | | | | | | |
|---|---|---|---|---|---|---|---|---|---|---|---|---|---|---|---|---|
| | | Color Factor | Light Trans- mission | Haze | Purity | Color Factor | | | Light Transmission | | | Haze | | | Purity | | |
| | | | | | | 200 hrs. | 500 hrs. | 1000 hrs. | 200 hrs. | 500 hrs. | 1000 hrs. | 200 hrs. | 500 hrs. | 1000 hrs. | 200 hrs. | 500 hrs. | 1000 hrs. |
| G | Control- Polysulfone I Only | 97 | 77.2 | 10.3 | 12.8 | 252 | 354 | 360 | 69.0 | 37.5 | 35.2 | 50.3 | 98.9 | 100 | 31.7 | 43.2 | 52.3 |
| 3 | Polyarylate I over Polysulfone I | 84 | 62.5 | 20.1 | 11.1 | 54 | 104 | 175 | 68.1 | 80.0 | 79.0 | 23.1 | 15.6 | 15.9 | 6.7 | 13.0 | 24.5 |
| 4 | Polyarylate II over Polysulfone I | 91 | 63.7 | 26.2 | 12.0 | 94 | 99 | 189 | 67.9 | 77.6 | 76.4 | 30.3 | 23.3 | 26.2 | 11.8 | 12.7 | 25.4 |
| 5 | Polyarylate III over Polysulfone I | 91 | 78.7 | 6.5 | 12.0 | 122 | 137 | 147 | 79.4 | 78.5 | 79.5 | 10.3 | 12.2 | 17.4 | 15.9 | 17.5 | 19.5 |
| 6 | Polyarylate III over Polysulfone I | 92 | 78.0 | 6.9 | 12.8 | 122 | 136 | 148 | 79.9 | 78.9 | 79.7 | 10.8 | 9.4 | 11.8 | 16.2 | 17.1 | 19.6 |

The results of Table II clearly illustrate that the polyarylate films and coatings provide desirable protection for a polysulfone substrate from the adverse effects of prolonged weathering exposure including ultraviolet irradiation exposure even at thin coatings, e.g., 1.5 mils thickness as demonstrated in Examples 5 and 6. It is noted that the polysulfone control, i.e., Example G, exhibited a major increase in color factor and haze and a decrease in light transmission after weathering exposure. When Polysulfone I was covered with a polyarylate film, i.e., Polyarylate I and Polyarylate II in Examples 3 and 4 respectively, the color factor, light transmission, haze and purity were considerably less affected after weathering exposure. Similar results are noted for the solution-coated laminates of Examples 5 and 6. The light transmission and haze data were measured on the composite samples of polysulfone and polyarylate film in Examples 3 and 4 for initial values and values listed at 200 hours exposure, thus the light transmission and haze values are not as good as the polyarylate solution-coated polysulfone of Examples 5 and 6 due to the air interlayer and the addition of two new surfaces in the composite samples.

EXAMPLES H THROUGH M

Samples of Polysulfone I/Polyarylate III blends described in Table III below were extruded and compression molded at 250° C. in a 4 inch by 4 inch by 0.020 inch cavity mold and a 4 inch by 4 inch by 0.125 inch cavity mold. The resulting plaques were submitted for accelerated weatherability by placing each plaque in an artificial weathering unit in accordance with the procedure and equipment described in ASTM D-1499. After 500 hours of weathering exposure, the plaques for both sample sizes were removed from the weathering unit. The color factor, yellowness index and purity were determined for each Polysulfone I/Polyarylate III blend compression molded in the 4 inch by 4 inch by 0.125 inch cavity mold. The pendulum impact strength was determined for each Polysulfone I/Polyarylate III blend compression molded in the 4 inch by 4 inch by 0.020 inch cavity mold. The results of the color factor, yellowness index, purity and pendulum impact strength tests after 500 hours of weathering exposure are given in Table III. The initial color factor, yellowness index, purity and pendulum impact strength of the Polysulfone I/Polyarylate III plaques before weathering exposure are also given in Table III.

TABLE III

EFFECT OF WEATHERING EXPOSURE ON COLOR FACTOR, YELLOWNESS INDEX, PURITY AND PENDULUM IMPACT STRENGTH OF POLYSULFONE I/POLYARYLATE III BLENDS

| | | Initial Data Before Weathering Exposure | | | | Data After 500 Hours of Weathering Exposure | | | |
|---|---|---|---|---|---|---|---|---|---|
| Example | Blend Description | Color Factor | Yellowness Index | Purity | Pendulum Impact Strength (ft. lbs./cu. in.) | Color Factor | Yellowness Index | Purity | Pendulum Impact Strength (ft. lbs./cu. in.). |
| H | Control-Polysulfone I Only | 108 | 24.5 | 13.2 | 170 | 363 | 73.4 | 44.3 | 7 |
| I | Polysulfone I (99 wt. %) Polyarylate III (1 wt. %) | 114 | 27.6 | 14.4 | 170 | 268 | 54.9 | 34.1 | 6 |
| J | Polysulfone I (97 wt. %) Polyarylate III (3 wt. %) | 154 | 34.7 | 19.1 | 170 | 290 | 60.5 | 36.6 | 7 |
| K | Polysulfone I (95 wt. %) Polyarylate III (5 wt. %) | 190 | 43.0 | 23.5 | 170 | 273 | 60.7 | 34.6 | 10 |
| L | Polysulfone I (90 wt. %) Polyarylate III (10 wt. %) | 246 | 57.7 | 32.0 | 170 | 332 | 74.0 | 43.5 | 10 |
| M | Polysulfone I (75 wt. %) Polyarylate III (25 wt. %) | 297 | 66.8 | 36.9 | 170 | 369 | 73.3 | 46.1 | 35 |

Examples H through M clearly illustrate that blends of a polysulfone and polyarylate, i.e., Polysulfone I and Polyarylate III, are not stable upon ultraviolet irradiation exposure. The polyarylate is an ineffective ultraviolet irradiation stabilizer when blended with a polysulfone. As a laminate composition, however, a polyarylate laminated upon the surface of a poly(aryl ether) particularly polysulfone, exhibits excellent protective properties, preventing deterioration of polysulfone after prolonged ultraviolet irradiation exposure.

We claim:

1. A laminate composition comprising a polyarylate, or blends thereof, derived from a dihydric phenol and an aromatic dicarboxylic acid which is laminated upon the surface of a poly(arylether) having recurring units of the formula:

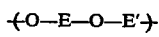

wherein E is the residuum of a second dihydric phenol and E' is the residuum of a dihalobenzenoid compound having an inert electron withdrawing group in at least one of the positions ortho and para to the valence bonds wherein both of said residuum are valently bonded to the ether oxygens through aromatic carbon atoms.

2. A laminate composition as defined in claim 1 wherein the dihydric phenol is of the formula:

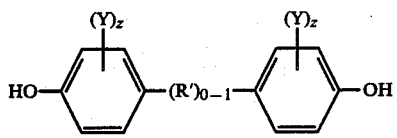

wherein Y is selected from alkyl groups of 1 to 4 carbon atoms, chlorine or bromine, z independently has a value of from 0 to 4 inclusive, and R' is a divalent saturated or unsaturated aliphatic hydrocarbon radical selected from alkylene and alkylidene radicals having from 1 to 3 carbon atoms, and cycloalkylene and cycloalkylidene radicals having up to and including 9 carbon atoms.

3. A laminate composition as defined in claim 2 wherein each z is 0 and R' is an alkylidene radical of 3 carbon atoms.

4. A laminate composition as defined in claim 1 wherein the dihydric phenol is hydroquinone.

5. A laminate composition as defined in claim 1 wherein the dihydric phenol is resorcinol.

6. A laminate composition as defined in claim 1 wherein the aromatic dicarboxylic acid is selected from terephthalic or isophthalic acids, or mixtures thereof.

7. A laminate composition as defined in claim 1 wherein the polyarylate is derived from bisphenol-A and a mixture of 50 mole percent each of terephthalic and isophthalic acids.

8. A laminate composition as defined in claim 1 wherein the polyarylate is derived from hydroquinone and a mixture of 50 mole percent each of terephthalic and isophthalic acids.

9. A laminate composition as defined in claim 8 wherein the poly(aryl ether) has repeating units of the formula:

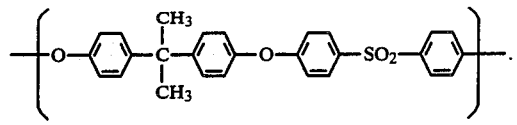

10. A laminate composition as defined in claim 1 wherein the poly(aryl ether) has repeating units of the formula:

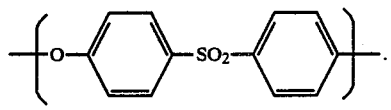

11. A laminate composition as defined in claim 1 wherein the polyarylate has a layer thickness of at least about 1 mil.

* * * * *